Patented Apr. 10, 1951

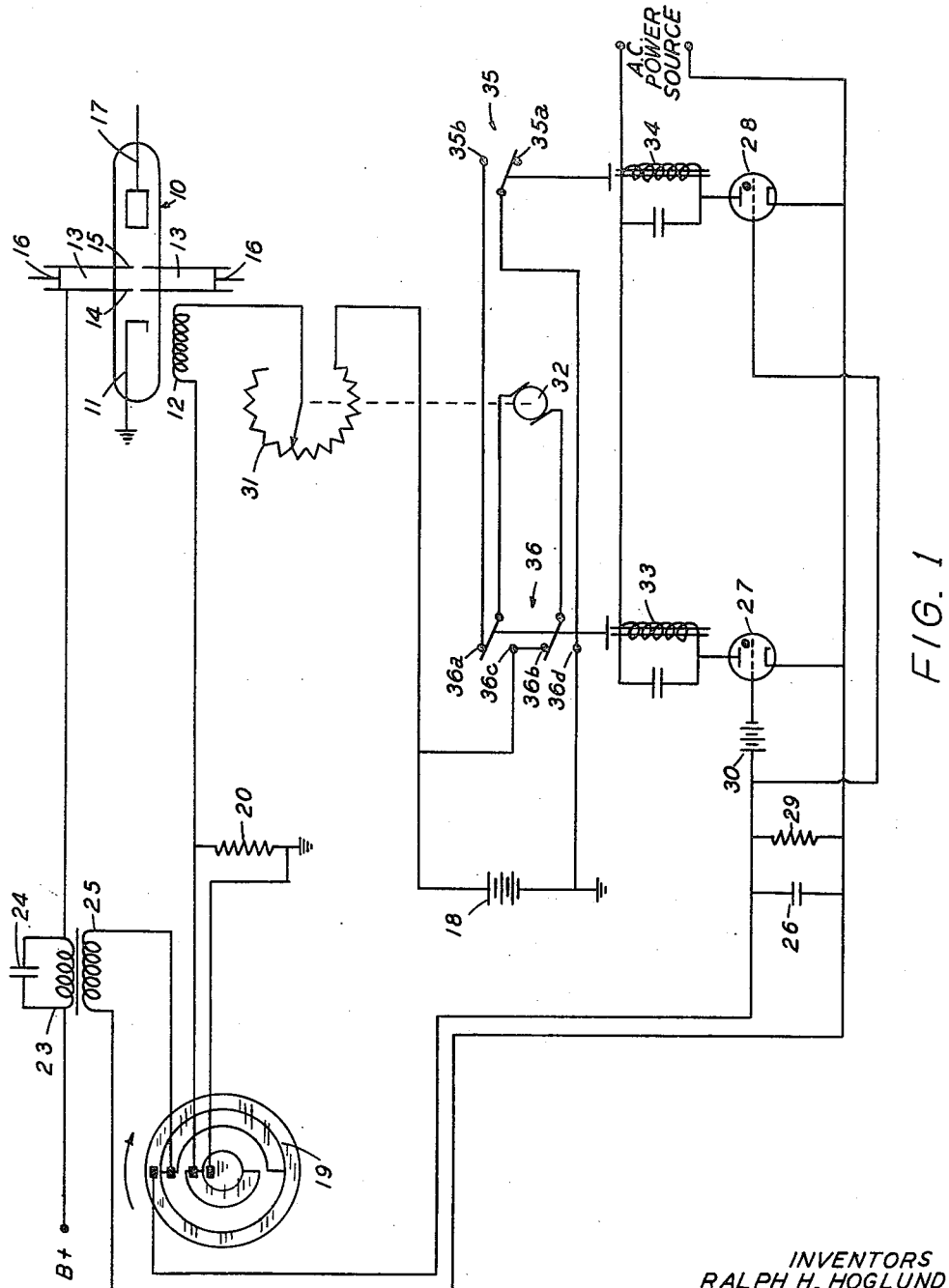

2,548,791

UNITED STATES PATENT OFFICE 2,548,791

AUTOMATIC FOCUSING CIRCUIT

Ralph H. Hoglund, George E. Hulstede, and Anthony J. Yakutis, Cambridge, Mass., assignors to the United States of America as represented by the Secretary of War Application October 19, 1945, Serial No. 623,416

11 Claims. (Cl. 315—31)

This invention relates generally to electrical circuits. More particularly it relates to circuits for the automatic control of focusing a beam of electrons.

In many electronic devices, such as velocity-modulation tubes, it is desired to focus a beam of electrons within a limited distance along the axis of the beam. For example, for proper operation of a velocity-modulation tube it is necessary to have the focal point of the beam between the grids terminating a resonant cavity associated with the tube. The general method used to focus a beam of electrons is to subject the beam to a magnetic field. Due to variations in the electrical circuits and in the characteristics of different tubes, the problem has arisen of maintaining this field at a strength that under all operating conditions, will keep the beam focused within the desired limits. Although this problem is encountered when such a tube is operated at a single frequency, it is much more serious when it is desired to vary the frequency of operation over a wide band. The frequency of a velocity-modulation tube may be varied within a certain limited range by adjusting a plunger or otherwise varying the shape of the associated resonant cavities. However, beyond that limited range it is necessary to vary the potential of the various electrodes and the strength of the focusing field. The adjustment of the current in the focusing coil creating the focusing field is critical and greatly hinders rapid tuning of a tube to a new frequency.

It is an object of the present invention to provide an automatic control for keeping an electronic beam constantly focused within a predetermined space.

It is a further object of the present invention to provide means for automatically varying the strength of the focusing field to keep the focus of an electron beam constant despite variations in operating frequencies and in other characteristics of the electron device in which the beam is formed.

It is another object of the present invention to provide automatic control of the focus of an electron beam to enable unitary control of the adjustment of all the parameters of a velocity-modulation tube which must be adjusted to tune the tube from one operating frequency to another.

Generally, the principle of this invention uses the current occurring in the grids forming the cavity within which it is desired that the focal point of the electron beam will occur as a control of the current creating the focusing field in combination with means to impress a very low frequency modulation on the focusing current in order that the correcting current may be applied in the proper positive or negative sense.

Other objects, features, and advantages of this invention will suggest themselves to those skilled in the art and will become apparent from the following description of the invention taken in connection with the accompanying drawings in which:

Fig. 1 is a schematic diagram of a circuit and apparatus employing the principles of this invention as applied to a velocity-modulation tube;

Figure 3:
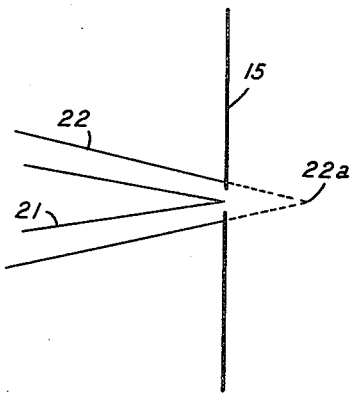
Fig. 3 is a diagrammatic representation of an electron beam which is overfocused, that is, where the focal point is long of its desired position.

Referring now to Fig. 1, 10 represents a conventional magnetically focused reflex type of velocity-modulation tube having a beam-forming cathode 11, focusing coil 12, single resonant cavity 13, terminated by grids 14 and 15, and tunable plunger 16, 16, and electrode 17. A direct current potential is impressed on cavity 13 from the source B+.

A direct current is supplied to focusing coil 12 from any suitable current source 18 through the circuits hereinafter to be more fully described. In the circuit of focusing coil 12 and current source 18 is a motor driven commutator 19 which inserts resistor 20 into the circuit and in series with focusing coil 12 for a portion of each rotation of commutator 19. The effect of introducing resistor 20 into this circuit is to impress a modulation on the current through focusing coil 12 and the speed at which commutator 19 is driven is such that the modulation superimposed on the focusing current is of a very low frequency, say a few cycles per second. The excursion of focusing coil current caused by the commutation of resistor 20, will produce a negligible effect on the grid current when the beam is initially properly focused. This will be more fully understood by the following description more specifically related to Figs. 2, 3, and 4.

Figure 2:
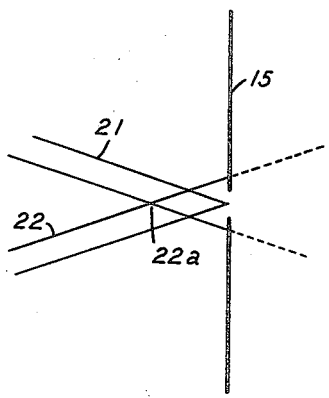
Fig. 2 is a diagrammatic representation of an electron beam which is underfocused, that is, where the focal point is short of its desired position.

When the electron beam is properly focused, few, if any, electrons strike grids 14 and 15 but, if the beam is improperly focused, a large portion of it hits grid 15 as may be more clearly seen by reference to Figs. 2 and 3. In Figs. 2 and 3 a properly focused electron beam is shown by 21. It is to be noted that the beam does not strike grid 15 and only a very small current resulting from stray electrons will flow in this grid. However, if the beam is underfocused, as shown by 22 in Fig. 2, the focal point 22a occurs before grid 15 is reached and the beam widens so that sufficient electrons strike grid 15 to set up an appreciable current therein. Likewise, if the beam is overfocused, as shown by 22 in Fig. 3, the focal point 22a is beyond grid 15 and again sufficient electrons strike grid 15 to set up an appreciable current therein. The magnitude of the grid current will, in general, vary with the amount of defocusing of the electron beam and experimentation has shown that this current varies in accordance with the curve shown in Fig. 4. However, it is to be noted that whether the focusing current is too great resulting in underfocusing or too small resulting in overfocusing, the grid current increases.

This grid current caused by this underfocusing or overfocusing is passed through the primary 23 of a transformer in the voltage supply lead of cavity 13. Primary 23 is shunted by condenser 24 chosen to be of proper value so that the resultant voltage fluctuations in the secondary 25 of the transformer are of approximately sinusoidal shape. These fluctuations are used to charge a capacitor 26 connected between the grids and cathodes of two gas filled tubes 27 and 28 and shunted by resistor 29. However, between secondary 25 and capacitor 26 the circuit is connected to segments of commutator 19. These segments function so that capacitor 26 is connected to secondary 25 during substantially the same time that resistance 20 is in the circuit of focusing coil 12. The charge on capacitor 26 thus changes the condition of the gas filled tubes 27 and 28 from conducting to nonconducting and vice versa only when resistor 20 is in the circuit.

One of these tubes 27 has a negative bias impressed on its grid by battery 30 so that it is below cut-off during normal conditions and therefore is normally nonconducting. Tube 28 has no bias on its grid and therefore is normally conducting. When capacitor 26 is positively charged this positive potential overcomes the negative bias on tube 27 and that tube becomes conductive while tube 28 remains conductive. When a negative charge is present on capacitor 26, tube 27 remains nonconducting and the grid of tube 28 goes below its cut-off voltage and this tube also becomes non-conducting. Thus there exists the condition that when there is no charge on capacitor 26, current flows through one tube; when there is a positive charge, current flows through both tubes; and when there is a negative charge, current flows through neither tube.

A motor driven variable resistor 31 is inserted between focusing coil 12 and current source 18. A reversible motor 32, operating resistance 31, is controlled by solenoids 33 and 34 in the plate circuits of tubes 27 and 28. When these tubes are in normal condition, that is, with current flowing through tube 28 only, single pole switch 35 is closed on contact 35a and double pole double throw switch 36 on contacts 36a and 36b. In this position of the switches, motor 32 does not rotate and there is no change in the resistance of resistor 31. When capacitor 26 is positively charged, that is, when current is flowing through both tubes 27 and 28, switch 35 will remain in the same position but solenoid 33 acts to move switch 36 to close contacts 36c and 36d. In this position of the switches current runs through the motor so that it rotates in a direction to decrease the resistance of resistor 31 in the circuit. When capacitor 26 is negatively charged, that is, when no current is flowing through either tube 27 or 28, switch 35 will close on contact 35b and switch 36 will close on contacts 36a and 36b. In this position of the switch current runs through the motor so that it rotates in the reverse direction to that described above and the resistance of resistor 31 in the circuit is increased. It is thus seen that for a positive charge on capacitor 26 resistance is reduced by resistor 31 and the current through focusing coil 12 is increased. For a negative charge on capacitor 26 the resistance is increased and the current through focusing coil 12 is decreased.

Figure 4:
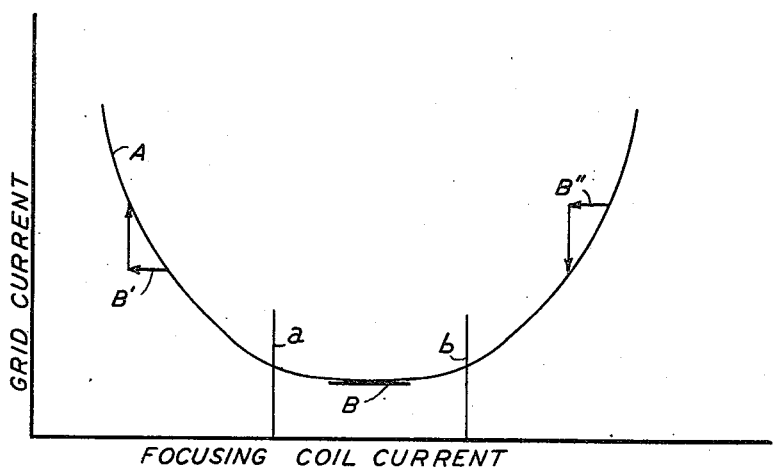
Fig. 4 is a graph showing the relation between the current in the focusing coil, the current produced in the grids, and the modulation impressed on the focusing current.

Referring to Fig. 4, curve A represents the relation of the grid current running through the primary 23 to the magnitude of the focusing coil current. It is to be noted that as the focusing current increases the focal point is shortened and that as the focusing current decreases the focal point is lengthened. If the focusing current has a value anywhere between values $a$ and $b$ representing the relatively flat portion of curve A, the beam is correctly focused for proper operation of the tube. However, if the focusing current is decreased below the value $a$ or above the value $b$ the beam is either underfocused or overfocused and an appreciable amount of grid current, as shown by curve A, is present. B represents the amplitude of the low frequency modulation on the focusing current impressed by cutting resistor 20 in and out of the focusing coil circuit when the focusing current is of such value that the variation caused by the modulation current lies entirely between $a$ and $b$. Under this condition, there will not be sufficient grid current to charge capacitor 26 and operate motor driven resistor 31. Therefore, the current through focusing coil 12 will not be changed by resistor 31. When, however, the current through focusing coil 12 is too low for proper focusing the decrease in the focusing current by putting resistor 20 in circuit, as shown at B', will cause an appreciable increase in the grid current and therefore place a negative charge on capacitor 26. If the focusing current is originally too strong the decrease in it caused by inserting resistor 20 in circuit, as shown at B'', will cause a decrease in the grid current placing a positive charge on capacitor 26. Since commutator 19 is designed so that capacitor 26 is in circuit only when resistor 20 is in circuit with focusing coil 12, capacitor 26 receives a charge only when the current through focusing coil 12 is being decreased by modulating resistor 20. In this manner the circuits are arranged to give a negative and positive sense to the change in grid current so that the correction in the current through focusing coil 12 may be made in the correct direction. It is thus seen that the apparatus herein described operates automatically to increase the focusing current when the focal point is too long and to decrease the focusing current when the focal point is too short.

The present invention provides a means to enable unitary control of a velocity-modulation tube because it is a simple matter to gang the controls adjusting the cavity plunger and the potentials impressed on the various electrodes for operation at various frequencies and in different electrical modes. However, heretofore it has not been possible to include in such ganged controls a means of changing the focusing field when the frequency change is so great that the tube shifts from operation in one electric mode to that in another electric mode. From the foregoing description it is obvious that the automatic control of focusing may be operated in conjunction with unitary control of the tuning elements of a velocity-modulation tube.

While the present invention has been described in relation to a single cavity velocity-modulation tube, it is obvious that it may readily be applied and it is of great usefulness in any case where it is desired to focus automatically a beam of electrons.

While there has been here described what is at present considered to be the preferred embodiment of the invention, it will be obvious to those skilled in the art that various changes and modifications may be made therein without departing from the scope of the invention.

What is claimed is:

1. In a velocity-modulation electron tube including at least a beam forming cathode, a resonant cavity having a grid terminating said cavity, current operated beam focusing means for focusing said beam on said grid, a relay system comprising two gaseous tubes, one of said gaseous tubes being biased so as to be non-conducting, at least a single capacitor connected between the grids and cathodes of said gaseous tubes for regulating the conductive and non-conductive condition of each of said gaseous tubes, two solenoids, each of said solenoids being connected so as to be operated by a corresponding one of said gaseous tubes, a variable resistor in series with said beam focusing means for controlling the current therein, means connected to be actuated by said solenoids for effecting an adjustment of said variable resistor, a connection including a transformer from said grid of said velocity modulation tube to said capacitor, commutator means connected for periodically inserting into and withdrawing from the circuit of said beam focusing means a resistor whereby the current through said last means is periodically decreased, said commutator means also operating so that said capacitor is in circuit only when the current in said beam focusing means is being decreased, said last resistor being of such value that there is not sufficient change in current in said current operated means to charge said capacitor when said beam is properly focused but said change is sufficient to charge said capacitor and operate said relay system when said beam is appreciably out of proper focus, whereby said variable resistor is adjusted so as to control the current through said coil to maintain said beam in focus.

2. In electronic apparatus including means for producing a beam of electrons and current operated means for focusing said beam, a device for controlling the focus of said beam comprising polarized relay means, means connected to be operated by said relay means for adjusting the current in said beam focusing means, an electrode disposed with respect to said beam so that when said beam is in proper focus there is minimum current flow in said electrode and when said beam is progressively defocused the current flow in said electrode progressively increases, modulating means connected to said focusing means for periodically decreasing the current therein, commutating means coupled between said grid and said relay means for placing said relay means in circuit only when the current in said beam focusing means is being decreased by said modulating means whereby said relay means operates said means for adjusting the current in said beam focusing means to maintain said beam in focus.

3. A velocity modulated electron tube circuit comprising a velocity modulated electron tube having at least an electron emitting cathode; a resonant cavity including a grid terminating said cavity; a coil, positioned for forming said electrons into a beam focused on said grid; means for producing a current through said coil; means for periodically modulating the current through said coil; adjustable impedance means connected in circuit with said coil; means coupled to said grid for generating a control signal of a given polarity in response to a grid current increase above a given value, and a control signal of opposite polarity in response to a grid current decrease below a given value; and means coupled to said last-named means for adjusting said impedance means in accordance with the polarity of said control signal.

4. A circuit according to claim 3 wherein said means for modulating the current through said coil comprises a resistor and a means for periodically inserting said resistor in circuit with said focusing coil.

5. A circuit according to claim 4 wherein said control signal generating means comprises a transformer having a primary and a secondary winding, said primary winding being connected to said grid, an electrical energy storage means, and means for connecting said secondary winding across said electrical energy storage means for the periods said resistor is in circuit with said focusing coil.

6. A circuit according to claim 3 wherein said means for adjusting said impedance means comprises a reversible motor connected thereto, and means connected to said motor for effecting a rotation thereof in a given direction in response to a control signal of a given polarity, and a rotation thereof in an opposite direction in response to a control signal of opposite polarity.

7. A circuit according to claim 6 wherein the last named means comprise a normally conducting first gaseous tube, a normally cut-off second gaseous tube, first and second relays connected to said first and second tubes, respectively, a first normally inoperative circuit for rotating said motor in a given direction and connected to be energized when said first and second relays are closed, and a second normally inoperative circuit for rotating said motor in the opposite direction and connected to be energized when said first and second relays are open.

8. A circuit according to claim 3 wherein said adjustable impedance means comprises a potentiometer connected in series with said focusing coil.

9. A velocity modulated electron tube circuit comprising a velocity modulated electron tube having at least an electron emitting cathode; a resonant cavity including a grid terminating said cavity; a coil, including a means for supplying current therethrough, for forming said electrons into a beam focused on said grid; a resistor; commutator means connected to periodically insert said resistor in series with said coil, thereby periodically reducing the current therethrough; a transformer having a primary and a secondary winding, said primary winding being connected to said grid of said velocity modulated tube; a capacitor; commutator means for periodically connecting said secondary winding across said capacitor during the periods said resistor is in circuit with said coil; a first normally conducting gaseous tube having its grid and cathode connected across said capacitor; a second normally cut-off gaseous tube having its cathode and grid connected to the corresponding elements of said first tube; a potentiometer connected in series with said coil; a reversible motor connected to said potentiometer; means connected to said first and said second geseous tubes and connected to said motor for rotating said motor in a given direction when both of said gaseous tubes are conducting and in an opposite direction when both of said gaseous tubes are not conducting.

10. A circuit according to claim 9 wherein said first and second tubes have anode to cathode circuits and said means for rotating said motor comprises a normally open relay in the anode to cathode circuit of said normally cut-off tube, a normally closed relay in the anode to cathode circuit of said normally conducting tube, each of said relays being connected to be actuated when its corresponding tube is conducting, a normally inoperative circuit for rotating said motor in a given direction and connected to be energized when said first and said second relays are closed, and a second normally inoperative circuit for rotating said motor in the opposite direction, and connected to be energized, when said first and said second relays are open.

11. An electron tube circuit comprising an electron beam tube having a cathode, a focusing coil positioned adjacent said tube for focusing said electron beam, means for producing a current through said coil, means for continuously modulating the current through said coil, means including an electrode in said tube for deriving a control signal corresponding to the modulation of the focusing coil current but having one given characteristic when said electron beam is underfocused and a second given characteristic when said electron beam is overfocused, and means coupled to said last named means for varying the magnitude of the current through said focusing coil in accordance with the said given characteristics of the control signal.

RALPH H. HOGLUND.
GEORGE E. HULSTEDE.
ANTHONY J. YAKUTIS.

REFERENCES CITED

The following references are of record in the file of this patent:

UNITED STATES PATENTS

| Number | Name | Date |
|---|---|---|
| 2,128,639 | Diels | Aug. 30, 1938 |
| 2,253,864 | Muller | Aug. 26, 1941 |
| 2,272,165 | Varian et al. | Feb. 3, 1942 |
| 2,358,902 | Ziebolz | Sept. 26, 1944 |
| 2,409,179 | Anderson | Oct. 15, 1946 |
| 2,430,331 | Gallella et al. | Nov. 4, 1947 |